United States Patent [19]

Geissler

[11] Patent Number: 5,533,846
[45] Date of Patent: Jul. 9, 1996

[54] UNIVERSAL MILLING AND DRILLING MACHINE

[75] Inventor: Alfred Geissler, Pfronten, Germany

[73] Assignee: Deckel Maho GmbH, Germany

[21] Appl. No.: 377,701

[22] Filed: Jan. 25, 1995

[30] Foreign Application Priority Data

Jan. 25, 1994 [DE] Germany ............... 44 02 084.8

[51] Int. Cl.[6] ..................................... B23C 1/12
[52] U.S. Cl. ........................... 409/201; 409/211
[58] Field of Search ..................... 409/201, 211, 409/230, 231

[56] References Cited

U.S. PATENT DOCUMENTS

| | | | |
|---|---|---|---|
| 4,478,540 | 10/1984 | Sachot | 409/211 |
| 4,559,682 | 12/1985 | Sachot | 409/211 |
| 4,610,584 | 9/1986 | Malzkorn et al. | 409/201 |
| 5,391,026 | 2/1995 | Wu et al. | 409/201 |
| 5,413,439 | 5/1995 | Wu et al. | 409/211 |

FOREIGN PATENT DOCUMENTS

| | | | |
|---|---|---|---|
| 287748 | 10/1988 | European Pat. Off. | 409/201 |
| 2944983 | 7/1982 | Germany . | |
| 2167327 | 5/1986 | United Kingdom | 409/201 |

OTHER PUBLICATIONS

Prospectus SHW, UF5.

*Primary Examiner*—Daniel W. Howell
*Attorney, Agent, or Firm*—Lawrence A. Maxham; Baker, Maxham, Jester & Meador

[57] ABSTRACT

A universal milling and drilling machine provided with a swivel milling head for an automatic reset from horizontal to vertical machining. The driving of the work spindle is carried out by a driving motor via bevel gears and a shift transmission which ensures a high torque even in a low rotation speed range. For optimizing the power transmission between the driving motor and the work spindle, the shift transmission is arranged in the swivel milling head, and the bevel gear transmission is seated directly on the motor shaft of the driving motor. The swivel milling head is mounted on the front surface of a support housing, the front surface being downwardly inclined by 45°.

23 Claims, 2 Drawing Sheets

UNIVERSAL MILLING AND DRILLING MACHINE

BACKGROUND

1. Field of the Invention

The invention relates generally to a universal milling and drilling machine, and more particularly to a machine with a swivel milling head with automatic reset from horizontal to vertical machining, and a shift transmission enabling high torque at low rotation speed.

2. Discussion of the Related Art

In such a machine tool, known, for example, from German patent 2,944,983, a horizontal work spindle is arranged in the lower part of a spindle housing, which is used to carry out horizontal operations on a clamped workpiece in the conventional way. At the front wall of the spindle housing, being inclined upward by 45°, a swivel head is mounted which is rotatable about its 45° center axis. On one side of this swivel head, a vertical milling head is fixed, which can, by a 180° turning movement of the swivel head in the inclined plane, be moved from an upper horizontal standby position to its vertical operation position, and which can be fixed in this position. In the rear part of the spindle housing, a shift transmission coupled with a driving motor is arranged, the driving shaft of which is coupled, via a main shaft extending through the spindle housing and a sliding gear arrangement, either to the horizontal work spindle or, via an additional intermediate shaft with a bevel gear transmission, to the vertical work spindle. As the shift transmission is already arranged at the start of the whole gear train, all driving shafts, gears and related bearings located between the shift gear and the vertical and horizontal spindle must be designed and dimensioned for the transmission of high torques. Furthermore, the complete horizontal spindle arrangement demands considerable structural complexities and relatively large dimensions.

Further, a spindle arrangement for a universal milling and drilling machine is known (SHW-Prospekt UF5), in which a swivel head is mounted on the free front surface of the spindle head, the swivel head being arranged in a upwardly extending plane incline by 45° and rotatable by 180° with respect to the spindle head, respectively. This swivel head carries the horizontal spindle on one front surface, and a vertical milling head is screwed to the other front surface in the conventional way. By turning the swivel head about a rotation axis extending perpendicular to the plane inclined by 45°, either the horizontal spindle or the vertical spindle can be moved to its operation position. After the positioning of the one or the other work spindle, the positive or non-positive connection to the driving shaft of the main transmission is effected.

SUMMARY OF THE INVENTION

It is an object of the invention to further develop a universal milling and drilling machine of the above kind, so that an optimal power transmission from the driving motor to the work spindle is possible with a simpler structure and at reduced size.

This problem is solved, according to the invention, by the front wall of the support housing being downwardly inclined and the swivel head being combined with the milling head for forming a swivel milling head in which the shift transmission secondary to the bevel gear transmission is provided for the single work spindle.

The 45° downward incline of the front wall enables the usage of only a single milling head for the horizontal and vertical machining of a workpiece. For this purpose, the milling head itself is formed as a swivel milling head. By the transfer of the shift transmission into the swivel milling head, a high rotation speed can be maintained as long as possible in the whole gear train between the driving motor and the work spindle. The high rotation is only effected directly at the work spindle, so that the high torques associated with it will only occur at the end of the gear train directly in front of the work spindle. The gears and driving shafts primary to the work spindle can thus be operated with comparatively high rotation speeds and can have smaller dimensions due to the associated lower moments. The gearing of the bevel gears is in front of the reduction transmission, so that the bevel gears may have smaller dimensions due to the smaller moments. Due to such an arrangement, an optimum power transmission from the driving motor to the work spindle can be obtained with a relatively simple structure, while the size requirements and the production requirements are reduced.

In an appropriate design of the invention, the shift gear is provided with a spur wheel driven by the bevel gear transmission, which spur wheel is arranged on an intermediate shaft parallel to the work spindle in the swivel head. This spur wheel drives a set of sliding gears with two gears of different sizes which engage with associated gears on the work spindle, depending on the shifting position. Thus a compact two-step gear reducer transmission with a relatively compact size is provided.

According to another advantageous embodiment of the invention, the set of sliding gears is provided with a first counter gear, which, in a first shifting position, engages the spur wheel and a gear rim on the work spindle. A second counter gear connected to the first counter gear for rotation together, combs the spur wheel positioned on the work spindle in a second shifting position. This enables a simple shifting of two rotation speed ranges.

A construction simple in transmission technology with relatively small space requirements is obtained by an arrangement of the driving motor inclined by 45° in the movable support housing, the motor shaft extending coaxial with respect to the rotation axis of the swivel milling head and supporting the driving bevel gear of the bevel gear transmission on its front end. Thus only two bevel gears combing each other are required for the complete gear train, and the work spindle can be driven by a single common gear train in a vertical as well as in a horizontal operating position. A further simplification concerning the transmission technology can be obtained if the pivoting or turning movement of the swivel milling head is also carried out by the motor shaft, whereby a separate rotation drive for the swivel milling head is unnecessary. For this purpose, the motor shaft can, for example, be detachably connected to the housing of the swivel milling head so that the swivel milling head is turned together with the motor shaft.

If a separate actuating drive is used for the swivel milling head, it is appropriate to form the motor shaft extending through the motor as a hollow shaft and to arrange a setting shaft in this hollow shaft, the free front end of which setting shaft is fixedly connected to the housing of the swivel head and with the rear end of which, protruding from the hollow shaft, the actuating drive mounted in the support housing engages. Thereby a very compact and space-saving turning device for turning the milling head between the vertical and horizontal operation positions is obtained.

Furthermore, a detachable clamping device ensuring a turning-proof and accurate locking of the swivel milling head on the support housing during machining is provided.

BRIEF DESCRIPTION OF THE DRAWING

The objects, advantages and features of this invention will be more readily perceived from the following detailed description, when read in conjunction with the accompanying drawing, in which.

DESCRIPTION OF THE PREFERRED EMBODIMENTS

Figure 1:
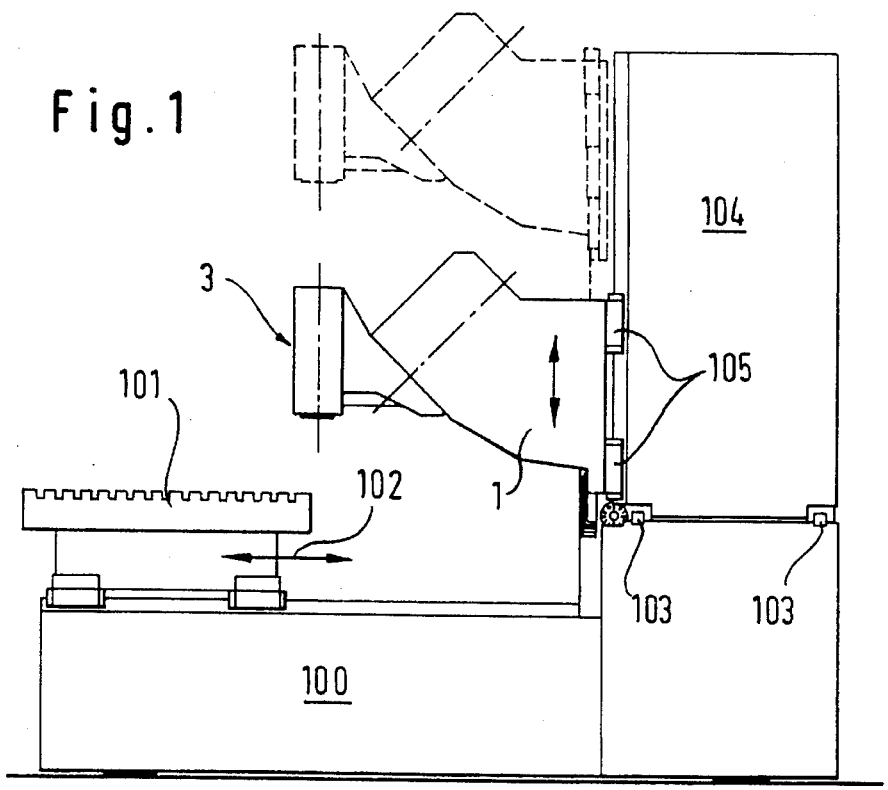
FIG. 1 is a schematic side view of the universal milling and drilling machine of this invention.

The machine tool shown in FIG. 1 has a support or bed 100 on which workpiece table 101 is movable in the directions of double arrow 102. On the rear part of bed 100, guide rails 103 are mounted perpendicular to the drawing plane, on which guide rails running stand 104 is supported and guided. On vertical guides 105 mounted on the front side of running stand 104, swivel milling head 3, formed according to the invention, is arranged vertically and movably mounted on support housing 1.

Support housing 1 is movably guided on running stand 104 and has front wall 2 on its free front end which is inclined by 45° with respect to the vertical plane and obliquely extending downwardly. On this front wall 2, swivel milling head 3 having contact surface 4, which is as well inclined by 45° with respect to the vertical plane, is mounted to be rotatable around rotation axis 5 perpendicular to front wall 2. Within swivel milling head 3, work spindle 6, arranged at an angle of 45° with respect to the rotation axis 5, is supported, which, by a related turn of swivel milling head 3, can be pivoted between a horizontal operation position shown by a solid line in FIG. 2, and a vertical operation position shown by a dotted line.

In support housing 1, rotation speed controlled drive motor 7 is arranged, the motor and motor shaft 8 thereof being coaxial with respect to rotation axis 5. Driving bevel gear 9 of a bevel gear transmission is mounted on shaft 8. Driving bevel gear 9 engages with driven bevel gear 10 seated in swivel milling head 3 on intermediate shaft 11 parallel to work spindle 6. Further, spur wheel 12 is secured to driven bevel gear 10 for rotation therewith on intermediate shaft 11. Spur wheel 12 engages with larger counter gear 13 of a set of sliding gears 14. Sliding gear set 14 is axially movable on counter shaft 15 and comprises smaller counter gear 16 connected to larger counter gear 13 for rotation therewith, counter gear 16 engaging large gear 17 on work spindle 6 in a first shifting position shown in FIG. 2. In this shifting position, the power transmission works from driving motor 7 through bevel gear transmission 9, 10 and spur wheel 12 to larger counter gear 13 and through smaller counter gear 16 to large gear 17 on work spindle 6. This provides a reduction of the motor rotation speed. When an axial displacement of the set of sliding gears 14 is effected, larger counter gear 13 remains engaged with spur wheel 12 and additionally engages small gear 18 on work spindle 6 in a second shifting position. Simultaneously, smaller counter gear 16 connected to larger counter gear 13 is disengaged from large gear 17 on work spindle 6. In this second shifting position, the power transmission works from driving motor 7 through bevel gear transmission 9, 10 and spur wheel 12 to large counter gear 13 and to small gear 18 on work spindle 6. As bevel gears 9 and 10, as well as spur wheel 12 and small gear 18 on work spindle 6 have an equal diameter in the embodiment shown in FIG. 2, larger counter gear 13 merely functions as an intermediate gear. A 1:1-transmission ratio between driving motor 7 and work spindle 6 is obtained in the second shifting position.

Figure 3:
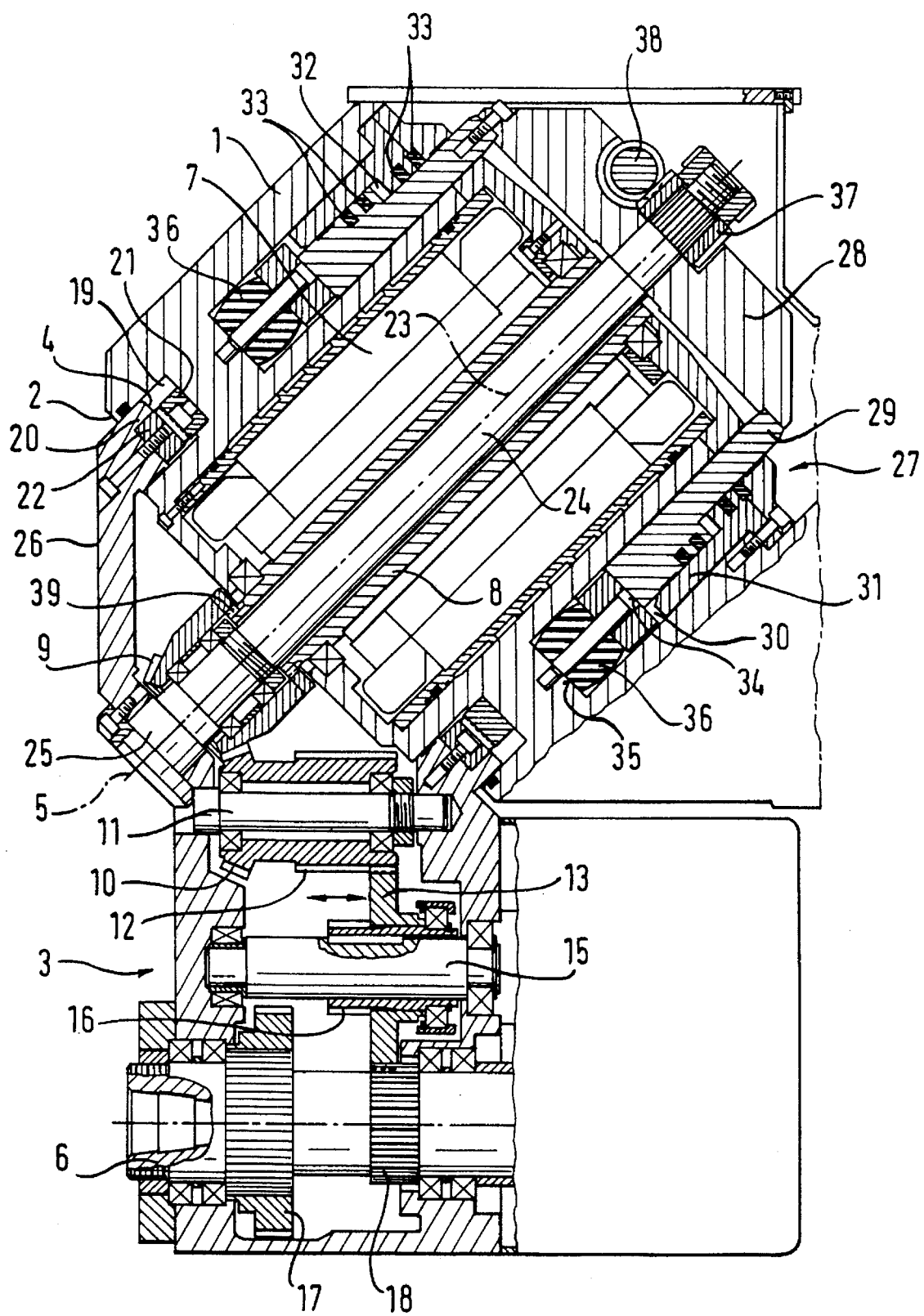
FIG. 3 is an enlarged sectional side view of the drive according to FIG. 2.

In the more detailed exemplary embodiment shown in FIG. 3, ring groove 19 is formed in front wall 2 of support housing 1, in which ring shaped shoulder 20 is inclined by 45° with respect to the rotation axis of work spindle 6 of swivel milling head 3. At the inside of ring groove 19, wheel rim 21 with a serration is arranged which engages with correspondingly serrated wheel rim 22 on ring-shaped shoulder 20 of swivel milling head 3. In driving shaft 8, formed as a hollow shaft, a rotatable and axially movable actuating shaft 24 is mounted, and free front shaft end 25 is connected to housing 26 of swivel milling head 3 for rotation therewith. By means of detachable clamping device 27, actuating shaft 24 is movable in the axial direction in such a way that ring shaped shoulder 20 on swivel milling head 3 is retracted into ring groove 19 through actuating shaft 24. Serrated wheel rims 21 and 22 are impressed on support housing 1 and on housing 26 of swivel milling head 3, respectively. Thereby a positive engagement and position-accurate connection between support housing 1 and swivel milling head 3 is obtained during machining.

Detachable clamping device 27 comprises pressure plate 28 fixed at the rear section of actuating shaft 24 which protrudes from hollow driving shaft 8. Pressure plate 28 is also fixedly connected to setting ring 29, which extends, in an axially shiftable way, at the inner wall of ring space 30, coaxial to driving motor 7, in support housing 1. On its outside, setting ring 29 extends in insertion sleeve 31, which is inserted in ring space 30 and fixed to support housing 1. Pressure chamber 32, being subject to pressure fluid, is bounded by setting ring 29 and insertion sleeve 31 and is sealed by sealing rings 33 in both setting ring 29 and insertion sleeve 31. Between front surface 34 of setting ring 29 and rear surface 35 on support housing 1 opposite to ring groove 19, elastic pressure element 36 is provided, by which actuation shaft 24 is axially biased, by means of setting ring 29 and pressure plate 28, to maintain the non-rotating connection between support housing 1 and swivel milling head 3. The rear end of actuating shaft 24 protruding beyond pressure plate 28 supports external teeth 37 engaging with driven worm gear 38.

For turning swivel milling head 3, pressure chamber 32 is charged with pressurized fluid, whereby setting ring 29 is axially moved from its clamping position against the biasing force effected by elastic pressure element 36, until the serration in ring groove 19 positioned between support housing 1 and swivel milling head 3 is disengaged. Simultaneously, driving bevel gear 9 arranged on actuating shaft 24 is also axially moved, whereby gearing 39, acting between bevel gear 9 and driving shaft 8 of driving motor 7, is disengaged. By a following turn of worm gear 38, actuating shaft 24 can be turned into an inclined position or into one of the stable positions together with swivel milling head 3 and the complete transmission. When swivel milling head 3 has reached the desired position, the pressure fluid in pressure chamber 32 can be drained, whereby setting ring 29 is pushed back into the clamping position by the power of elastic pressure element 36, and the serration between support housing 1 and swivel milling head 3 as well as gearing 39 between bevel gear 9 and driving shaft 8 are engaged, in a non-rotational way, by pressure plate 28 and actuating shaft 24.

The transmission of the rotational movement from driving motor 7 to work spindle 6 is effected through driving hollow cylindrical bevel gear 9, which is rotatably arranged on actuating shaft 24 between its front end 25 fixedly connected to the swivel head, and front wall 2 of support housing 1, and connected, for combined rotation, with hollow motor shaft 8 of driving motor 7 through gearing 39. Driving bevel gear 9 combs the driven, also hollow, cylindrical bevel gear 10 rotatably arranged on intermediate shaft 11 parallel to work spindle 6 together with spur wheel 12. Spur wheel 12 and driven bevel gear 10 are formed as a unitary component with a serration and a bevel gearing. They may, however, also be formed as two separate single gears connected for co-rotation, to each other and, if required, to intermediate shaft 11.

Spur wheel 12 engages larger counter gear 13, which, together with smaller counter gear 16, are connected together for common rotation, and are axially movable on counter shaft 15, which is parallel to and laterally displaced with respect to work spindle 6. Counter shaft 15 may be arranged in the same plane with work spindle 6 and spur wheel 12 or, for reducing the spatial requirements, displaced laterally and in height with respect to the position shown in FIG. 2.

Counter shaft 15 is rotatably arranged in swivel milling head 3. Small counter gear 16 is formed as a shift lining, mounted for rotation on counter shaft 15. The front portion of gear 16 is configured for engagement with large gear 17 on work spindle 6. On the rear portion shift lining 16 may be free of gear teeth and fixed to larger counter gear 13 for rotation therewith. The rear end of the shift lining is arranged, by means of a plain bearing, in a shifting sleeve which is axially movable by an actuating cylinder (not shown). Thus, by operating the actuating cylinder, gears 13 and 18 can be engaged, or gears 16 and 17 can be engaged. Work spindle 6 may be disengaged from driving motor 7 when gears 16, 13 are in an intermediate position. Due to this two-step shift transmission, work spindle 6 can be provided with a high toque even in the lower rotation speed range.

Figure 2:
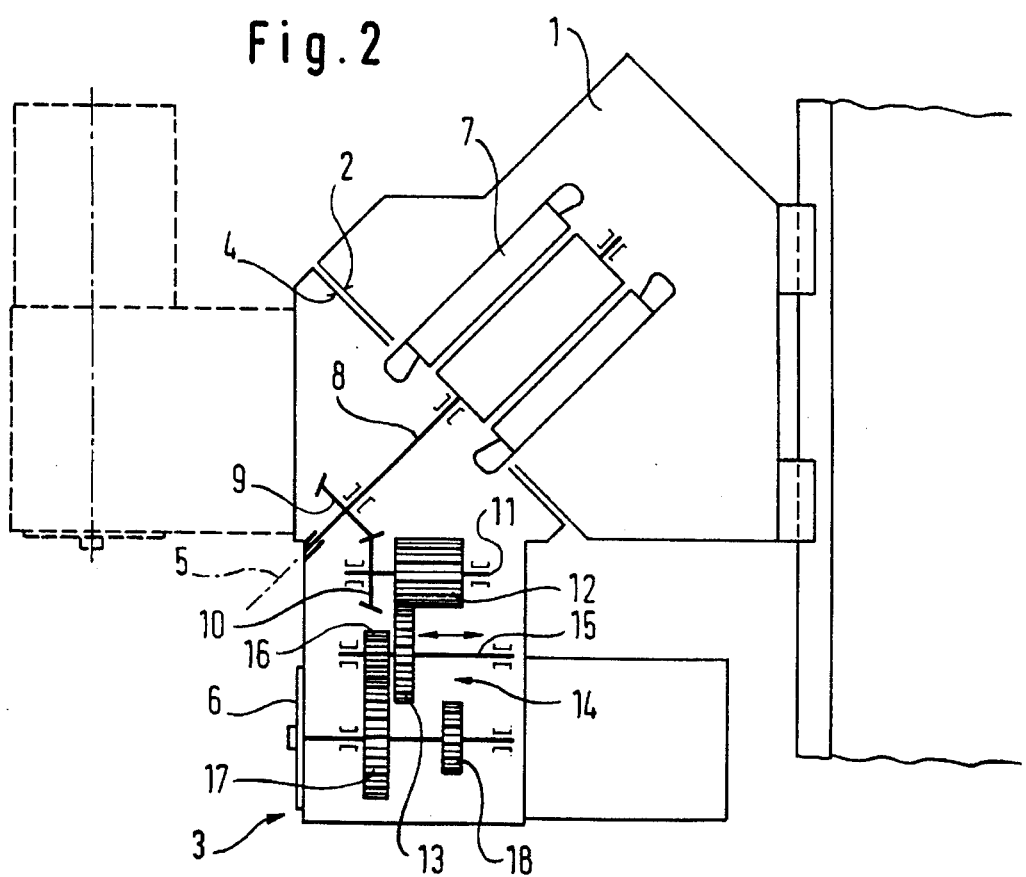
FIG. 2 is a more detailed schematic side view of an overall drive for the machine according to FIG. 1.

The invention is not limited to the embodiments shown. For example, the drive arrangement shown in FIGS. 2 and 3 can also be applied to other milling and drilling machines, where, among other changes, the support frame would have to be constructively adapted in those cases. Further, swivel milling head 3, instead of being turned by turning drive 24, 25, 37, 38 as shown in FIG. 3, could be directly turned by motor shaft 8, which—as schematically shown in FIG. 2 by the clamping sleeve indicated on the shaft end—can be detachably connected to the housing of the swivel milling head. With this derived turning drive of swivel head the whole construction is considerably simplified as the components for the above separate turning drive can be abandoned. Finally, other means for accurately locking swivel milling head 3 in any preselected inclined positions or in the end positions can be used instead of clamping device 27 and gearings 21, 22 shown. Even though the arrangement of the driving motor 7 in support housing 1 inclined by 45° is simple in transmission technology and is space-saving, driving motor 7 can as well be mounted in or on the support housing in another alignment with a further reversing transmission being used, if required, and/or an adaptation of the existing transmission elements being required. The work spindle can also be arranged in a telescoping sleeve, whereby the work area is enlarged.

Other modifications and improvements may occur to those skilled in this technical field which are within the scope of the appended claims.

What is claimed is:

1. A universal milling and drilling machine comprising:

a workpiece table mounted on a support;

a machine stand with a support housing mounted on it in operative relationship with said workpiece table;

a swivel head being turnable, at a support housing front wall inclined by 45° with respect to the vertical plane, around a rotation axis perpendicular to said support housing front wall;

a work spindle rotatably arranged in a milling head, the rotation axis of said work spindle being inclined by 45° with respect to the rotation axis of said swivel head; and a drive motor having a drive shaft which is selectively coupled to said work spindle through a bevel gear transmission and a shift transmission;

said from wall of said support housing being downwardly inclined; and said swivel head being combined with said milling head to form a swivel milling head in which said shift transmission, driven by said bevel gear transmission, for said single work spindle is arranged.

2. The universal milling and drilling machine according to claim 1, wherein said drive motor for said work spindle is so arranged in said support housing that a transmission input shaft extends coaxial to the rotation axis of said swivel milling head and supports a driving bevel gear of said bevel gear transmission.

3. The universal milling and drilling machine according to claim 2, wherein said drive shaft of said drive motor extends coaxial to the rotation axis of said swivel milling head.

4. The universal milling and drilling machine according to claim 3, wherein said driving bevel gear of said bevel gear transmission is arranged on an actuating shaft coaxial to the pivoting axis on said swivel milling head and is selectively coupled to the free end of said drive shaft of said drive motor coaxial to the pivoting axis.

5. The universal milling and drilling machine according to claim 4, wherein said drive shaft is formed as a hollow shaft in which said actuating shaft is connected for rotation therewith, with said swivel milling head.

6. The universal milling and drilling machine according to any one of claims 1 to 5, wherein said shift transmission is provided with a spur wheel driven by said bevel gear transmission on an intermediate shaft parallel to said work spindle and a set of sliding gears combing the spur wheel on a counter shaft parallel to said work spindle, said set of sliding gears having counter gears which are selectively engageable with gears on said work spindle.

7. The universal milling and drilling machine according to claim 6, wherein a second counter gear is formed as a sleeve arranged on said counter shaft for rotation and is axially shiftable therewith, said second counter gear being provided, in its front section, with an external toothing to engage with said second gear and supporting, on its rear section having no teeth, a first counter gear for rotation therewith.

8. The universal milling and drilling machine according to claim 6, wherein said set of sliding gears is arranged and axially secured in an axially movable shifting sleeve.

9. The universal milling and drilling machine according to claim 7, wherein said set of sliding gears is arranged and axially secured in an axially movable shifting sleeve.

10. The universial milling and drilling machine according to any one of claims 1 to 5, wherein means are provided for turning said swivel milling head between a horizontal and a vertical operation position.

11. The universal milling and drilling machine according to claim 7, wherein means are provided for turning said swivel milling head between a horizontal and a vertical operation position.

12. The universal milling and drilling machine according to claim 8, wherein means are provided for turning said swivel milling head between a horizontal and a vertical operation position.

13. The universal milling and drilling machine according to any one of claims 1 to 5, and further comprising means for turning said swivel milling head by said drive motor.

14. The universal milling and drilling machine according to claim 7, and further comprising means for turning said swivel milling head by said drive motor.

15. The universal milling and drilling machine according to claim 8, and further comprising means for turning said swivel milling head by said drive motor.

16. The universal milling and drilling machine according to any one of claims 1 to 5, wherein a detachable clamping device is arranged in said support housing for locking said swivel milling head at said support housing in the selected, non-rotatable machining position.

17. The universal milling and drilling machine according to claim 7, wherein a detachable clamping device is arranged in said support housing for locking said swivel milling head at said support housing in the selected, non-rotatable machining position.

18. The universal milling and drilling machine according to claim 8, wherein a detachable clamping device is arranged in said support housing for locking said swivel milling head at said support housing in the selected, non-rotatable machining position.

19. The universal milling and drilling machine according to claim 10, wherein a detachable clamping device is arranged in said support housing for locking said swivel milling head at said support housing in the selected, non-rotatable machining position.

20. The universal milling and drilling machine according to claim 13, wherein a detachable clamping device is arranged in said support housing for locking said swivel milling head at said support housing in the selected, non-rotatable machining position.

21. The universal milling and drilling machine according to claim 6, wherein means are provided for turning said swivel milling head between a horizontal and a vertical operation position.

22. The universal milling and drilling machine according to claim 6, and further comprising means for turning said swivel milling head by said drive motor.

23. The universal milling and drilling machine according to claim 6, wherein a detachable clamping device is arranged in said support housing for locking said swivel milling head at said support housing in the selected non-rotatable machining position.

\* \* \* \* \*